United States Patent
Higashi et al.

(10) Patent No.: US 11,944,944 B2
(45) Date of Patent: Apr. 2, 2024

(54) MIXING APPARATUS

(71) Applicant: KOBE STEEL, LTD., Hyogo (JP)

(72) Inventors: Kosuke Higashi, Hyogo (JP);
Kazuhisa Fukutani, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 1008 days.

(21) Appl. No.: 16/760,768

(22) PCT Filed: Oct. 24, 2018

(86) PCT No.: PCT/JP2018/039570
§ 371 (c)(1),
(2) Date: Apr. 30, 2020

(87) PCT Pub. No.: WO2019/093131
PCT Pub. Date: May 16, 2019

(65) Prior Publication Data
US 2020/0276544 A1 Sep. 3, 2020

(30) Foreign Application Priority Data
Nov. 7, 2017 (JP) .................... 2017-214760

(51) Int. Cl.
*B01F 25/4314* (2022.01)
*B01F 35/21* (2022.01)
*B01F 35/221* (2022.01)
*B01F 35/93* (2022.01)
*B01F 35/90* (2022.01)

(52) U.S. Cl.
CPC ...... *B01F 25/4314* (2022.01); *B01F 35/2113* (2022.01); *B01F 35/2115* (2022.01); *B01F 35/2213* (2022.01); *B01F 35/93* (2022.01); *B01F 2035/98* (2022.01); *B01F 2035/99* (2022.01)

(58) Field of Classification Search
CPC ............... B01F 25/4314; B01F 25/431; B01F 25/4315; B01F 25/43141; B01F 35/2213; B01F 35/93; B01F 35/2115; B01F 35/2113
USPC ........................................... 366/96
See application file for complete search history.

(56) References Cited

U.S. PATENT DOCUMENTS

| | | | |
|---|---|---|---|
| 5,171,089 A | 12/1992 | Kuo et al. | |
| 5,171,613 A | 12/1992 | Bok et al. | |

(Continued)

FOREIGN PATENT DOCUMENTS

| | | |
|---|---|---|
| EP | 3 708 324 A1 | 9/2020 |
| JP | S56-042325 U | 4/1981 |

(Continued)

OTHER PUBLICATIONS

Machine translation of JP2004195307A, accessed via https://worldwide.espacenet.com/ on Aug. 8, 2023.*

(Continued)

*Primary Examiner* — Marc C Howell
(74) *Attorney, Agent, or Firm* — Studebaker & Brackett PC

(57) ABSTRACT

A mixing apparatus includes a mixer configured to mix a material including a rubber or a resin in the presence of a working fluid that is in a supercritical state or a subcritical state. The mixer includes a chamber that forms a flow passage for the working fluid and the material, and a mixing blade disposed in the chamber and fixed to the chamber.

16 Claims, 15 Drawing Sheets

(56) References Cited

U.S. PATENT DOCUMENTS

| | | | |
|---|---|---|---|
| 5,308,648 A | 5/1994 | Prince et al. | |
| 5,330,783 A | 7/1994 | Saidman et al. | |
| 5,997,781 A | 12/1999 | Nishikawa et al. | |
| 6,583,187 B1 | 6/2003 | Daly et al. | |
| 2003/0185098 A1 | 10/2003 | Koch et al. | |
| 2008/0056064 A1* | 3/2008 | Tanaka | B29B 7/7457 366/339 |
| 2013/0269806 A1* | 10/2013 | Burns | B01F 25/40 137/594 |
| 2016/0250615 A1* | 9/2016 | Azevedo Ferreira | B01F 31/65 422/225 |

FOREIGN PATENT DOCUMENTS

| | | |
|---|---|---|
| JP | H04-260460 A | 9/1992 |
| JP | H05-049887 A | 3/1993 |
| JP | H10-230528 A | 9/1998 |
| JP | 2004-195307 A | 7/2004 |
| JP | 2005-103461 A | 4/2005 |
| JP | 2006-159165 A | 6/2006 |
| JP | 2009-125711 A | 6/2009 |
| JP | 2009-256451 A | 11/2009 |
| JP | 5259203 B2 | 8/2013 |
| JP | 2019-084763 A | 6/2019 |

OTHER PUBLICATIONS

Machine translation of JP2006159165A, accessed via https://worldwide.espacenet.com/ on Aug. 8, 2023.*

The extended European search report issued by the European Patent Office dated Dec. 11, 2020, which corresponds to European Application No. 18876160.5-1014 and is related to U.S. Appl. No. 16/760,768.

Nalawade S P et al.; "Prediction of the viscosity reduction due to dissolved CO2 of and an elementary approach in the supercritical CO2 assisted continuous particle production of a polyester resin"; Powder Technology; Dec. 14, 2006; pp. 143-152; vol. 170; No. 3; XP025124438; Elsevier; Basel CH.

International Search Report issued in PCT/JP2018/039570; dated Jan. 29, 2019.

Written Opinion issued in PCT/JP2018/039570; dated Jan. 29, 2019.

* cited by examiner

MIXING APPARATUS

TECHNICAL FIELD

The present disclosure relates to a mixing apparatus for mixing materials together.

BACKGROUND ART

For example, Patent document 1 discloses mixing (the term "kneading" is used in this document) materials (called "rubber materials" in the document) in the presence of a supercritical fluid or a subcritical fluid (refer to paragraph 0040 of the document). This mixing is performed mechanically by a kneading member such as a rotor or a screw (refer to paragraphs 0027 and 0040 of the document).

CITATION LIST

Patent Literature

Patent document 1: Japanese Patent No. 5,259,203

SUMMARY OF INVENTION

Technical Problem

In the technique disclosed in the above document, a rotary blade (called "a kneading member" in the above document) of a rotor, a screw, or the like rotates with respect to a chamber (called "rubber kneading chamber" in the above document). Thus, energy for rotating the rotary blade is necessary. Usually, a motive power source for rotating the rotary blade is provided outside the chamber. As a result, a gap is formed between the chamber and a member that connects the motive power source and the rotary blade. Furthermore, the pressure of a supercritical fluid or a subcritical fluid is set higher than atmospheric pressure. This raises a problem of insufficient sealing performance of the chamber.

In view of the above, an object of the present disclosure is to provide a kneading apparatus capable of dispensing with energy for rotating a rotary blade and securing necessary sealing performance of a chamber.

Solution to Problem

A mixing apparatus according to the disclosure includes a mixer. The mixer mixes a material including a rubber or a resin in the presence of a working fluid that is in a supercritical state or a subcritical state. The mixer includes a chamber and a mixing blade. The chamber forms a flow passage for the working fluid and the material. The mixing blade is disposed in the chamber 51 and fixed to the chamber.

Advantageous Effects of Invention

The above configuration makes it possible to dispense with energy for rotating a rotary blade and secure necessary sealing performance of a chamber.

DESCRIPTION OF EMBODIMENTS

Figure 1:
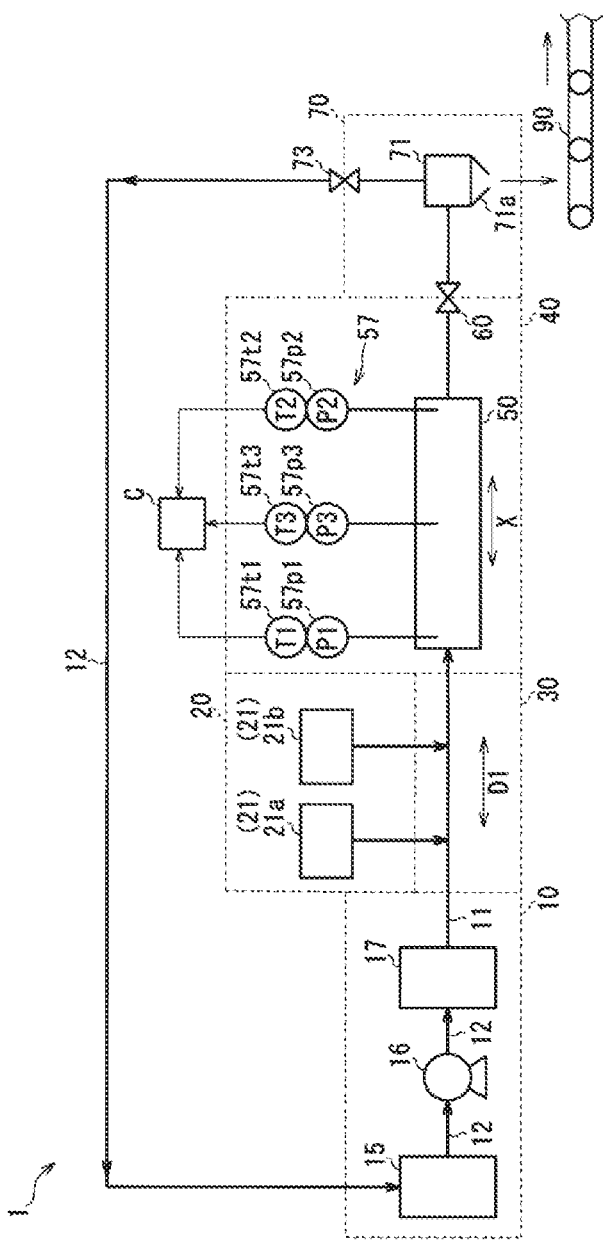
FIG. 1 is a block diagram of a mixing apparatus according to a first embodiment.

A mixing apparatus 1 according to a first embodiment is described with reference to FIG. 1 to FIG. 6.

The mixing apparatus 1 (kneading apparatus, stirring apparatus) is an apparatus for mixing materials 21 using a working fluid 11. The term "mixing" used above includes kneading and stirring. The mixing apparatus 1 includes a production unit 10, a storage unit 20, a dissolving unit 30, a mixing unit 40, a separation unit 70, a carry-out unit 90, and a control unit C.

The production unit 10 (supercritical production unit, subcritical production unit) is a unit for producing the working fluid 11. The working fluid 11 is a fluid in a supercritical state (supercritical fluid) or a fluid in a subcritical state (subcritical fluid). The mixing apparatus 1 is a supercritical mixing apparatus or a subcritical mixing apparatus. The temperature and the pressure of the supercritical fluid are higher than or equal to a critical temperature (Tc) and a critical pressure (Pc), respectively. The supercritical fluid has characteristics of a liquid and a gas. The supercritical fluid has an ability to melt a solute like a liquid does (dissolving ability) and an ability to diffuse a solute like a gas does (diffusing ability). The characteristics (dissolving ability and diffusing ability) of the subcritical fluid are approximately the same as those of the supercritical fluid.

For example, the temperature T and the pressure P of the subcritical fluid satisfy one of the following sets of conditions. The unit of temperatures T and critical temperatures Tc in the following examples is ° C. Example 1 of subcritical state: $T \geq Tc$ and $P<Pc$. Example 2 of subcritical state: $T<Tc$. $P<Pc$, T being sufficiently higher than room temperature, and P being sufficiently higher than normal pressure (atmospheric pressure). Examples 3 of subcritical state: $0.5<T/Tc<1.0$ and $0.5<P/Pc$. Example 4 of subcritical state: $0.5<T/Tc$ and $0.5<P/Pc<1.0$. Example 5 of subcritical state: $0.5<P/Pc$ when the critical temperature Tc is lower than or equal to 0° C.

It is preferable that the substances constituting the working fluid 11 be substances that can be rendered in the supercritical fluid or the subcritical fluid as easily as possible. The difference between the polarity of the working fluid 11 and that of the materials 21 is so small that the materials 21 can be dissolved in the working fluid 11. The substance that constitutes the working fluid 11 is carbon dioxide, for example. The critical temperature of carbon dioxide is 31° C. The critical pressure of carbon dioxide is 7.4 MPa. For example, carbon dioxide is in a subcritical state when its temperature is higher than or equal to 31° C. and its pressure is higher than or equal to 7.1 MPa. When its temperature is 20° C., carbon dioxide is in a subcritical state if its pressure is higher than or equal to 15 MPa. The substance that constitutes the working fluid 11 need not always be carbon dioxide and may be nitrogen, for example. In the following, the term "supercritical state or the like" may be used instead of the term "supercritical state or subcritical state." The working fluid 11 is rendered in a supercritical state or the like when the materials 21 are dissolved in the working fluid 11 in the dissolving unit 30 and when the materials 21 are mixed together in a mixer 50 in the presence of the working fluid 11. The working fluid 11 that is not in a supercritical state or the like (e.g., it is in the form of gas or liquid) is also referred to as a "fluid 12."

It is preferable that the working fluid 11 be in a supercritical state rather than a subcritical state. The materials 21 are mixed together more thoroughly when the working fluid 11 is in a supercritical state than when it is in a subcritical state. For example, where the materials 21 include a rubber (main material 21a described below), the quality of a rubber product (e.g., V-belt) manufactured through mixing by the mixing apparatus 1 may be evaluated by the wear rate of the rubber product. In this evaluation method, the wear rate increases (the quality degrades) in order of a case that the working fluid 11 being in a supercritical state is used, a case that the working fluid 11 being in a subcritical state is used, and a case that a fluid 12 at atmospheric pressure is used. For example, the production unit 10 includes a cooler 15, a pump 16, and a heater 17.

The cooler 15 (heat exchanger) converts the fluid 12 into a liquid by cooling a gas-form fluid 12. Where the fluid 12 is carbon dioxide, the cooler 15 converts a carbon dioxide gas at atmospheric pressure (0.1 MPa), for example, into a liquid.

The pump 16 sends out the working fluid 11 (causes it to flow) to the mixer 50. The pump 16 increases the pressure of a liquid-form fluid 12. Where the pump 16 increases the pressure of a liquid-form fluid 12, the size of the pump 16 can be made smaller than in a case that it increases the pressure of a gas-form fluid 12. Where the fluid 12 is carbon dioxide, the pump 16 increases its pressure to 2 to 3 MPa, for example.

The heater 17 (heat exchanger) evaporates the fluid 12 by heating a liquid-form fluid 12. The heater 17 pressurizes the fluid 12 by evaporating it in a container. As a result, the fluid 12 is rendered in a supercritical state or a subcritical state. Where the fluid 12 is carbon dioxide, the heater 17 pressurizes the fluid 12 to 7 to 8 MPa, for example.

The storage unit 20 (material storage unit) is a unit for storing materials 21. The storage unit 20 has outlets through which materials 21 are fed into the dissolving unit 30. The materials 21 include plural kinds of materials. For example, the materials 21 include a main material 21a (main row material) and an auxiliary material 21b (auxiliary row material, additive agent, additive). The main material 21a includes a polymeric material. The main material 21a includes a rubber or a resin. The auxiliary material 21b is a filler, for example. The auxiliary material 21b may include an inorganic substance or an organic substance. For example, the auxiliary material 21b may include a natural material-based material, a plant-origin material, a fiber material, or cellulose nanofiber (CNF) or the like. For example, the mixing apparatus 1 is a rubber mixing (kneading) apparatus, a resin mixing (kneading) apparatus, or the like.

The dissolving unit 30 is a unit for dissolving the materials 21 in the working fluid 11. The materials 21 are fed into the dissolving unit 30 from the storage unit 20. The working fluid 11 flows into the dissolving unit 30 from the production unit 10. Then the materials 21 are dissolved in the working fluid 11 in the dissolving unit 30. The materials need not always be dissolved fully in the working fluid 11, that is, only a part of the materials 21 may be dissolved in the working fluid 11.

The mixing unit 40 (kneading unit, stirring unit) is a unit for mixing the materials 21 together. The mixing unit 40 is provided downstream of the dissolving unit 30. The term "downstream" used above means the destination side of a flow of the working fluid 11 and the materials 21 (likewise, the term "upstream" means the source side of a flow of the working fluid 11 and the materials 21). The mixing unit 40 includes a mixer 50 and a degree-of-opening adjustment valve 60.

The mixer 50 (kneader, stirrer) mixes the materials 21 together in the presence of the working fluid 11 being in a supercritical state or a subcritical state (supercritical atmosphere or subcritical atmosphere). The mixer 50 mixes the main material 21a and the auxiliary material 21b together. Since this mixing is performed in the presence of the working fluid 11 being in a supercritical state or the like, the dispersion of the auxiliary material 21b and the mixing of the main material 21a and the auxiliary material 21b are accelerated more than in a case that they are mixed together in the presence of the fluid 12 that is not in a supercritical state or the like. The mixer 50 includes a chamber 51, a mixing blade 53, and a support structure 55 that are shown in FIG. 2 and sensors 57 shown in FIG. 1. The axial direction X is defined as the direction of a center axis of the chamber 51. Where the center axis of the chamber 51 is not straight (see FIG. 12), the axial direction X is defined as the direction of a straight line that passes through the center of an entrance and the center of an exit of the chamber 51.

As shown in FIG. 2, the chamber 51 is a container in which the materials 21 are mixed together. A flow passage (mixing flow passage) for the working fluid 11 and the materials 21 is formed inside the chamber 51. The chamber 51 is shaped like a pipe that is long in the axial direction X. In FIG. 2, a part of arrows indicating flow directions of the working fluid 11 and the materials 21 are given symbols of the working fluid 11 and the materials 21.

The chamber 51 (mixer 50) has an entrance-side portion and an exit-side portion. The entrance-side portion is a portion located upstream of the center of the chamber 51 in the axial direction X. The exit-side portion is a portion located downstream of the center of the chamber 51 in the axial direction X. As a result, the lengths of the entrance-side portion and the exit-side portion in the axial direction X are ½ of the overall length of the chamber 51 in the axial direction X. The length of at least one of the entrance-side portion and the exit-side portion in the axial direction X may be shorter than or equal to ⅓, ⅕, or 1/10 of the overall length of the chamber 51 in the axial direction X.

The mixing blade 53 (kneading blade, stirring blade) is a blade for mixing the materials 21 together. The materials 21 are mixed together because shearing forces act between the mixing blade 53 and the inner surface (wall surface) of the chamber 51. The mixing blade 53 is disposed inside the chamber 51. The mixing blade 53 extends in the axial direction X. The mixing blade 53 is fixed to the chamber 51. The mixing blade 53 is of a static mixer, that is, it is a static blade. The mixing blade 53 is a non-rotary blade that does not rotate with respect to the chamber 51. The mixing blade 53 is fixed to the chamber 51 via support structures 55. Since the mixing blade 53 is fixed to the chamber 51, it is not necessary to provide devices and members (rotary shaft etc.) for rotating the mixing blade 53. The mixing blade 53 has a shaft portion 53a and a blade portion 53b. The shaft portion 53a extends in the axial direction X and is shaped like a cylinder, for example. The blade portion 53b projects from the shaft portion 53a outward in the radial direction X (see FIG. 3). The blade portion 53b is shaped spirally, for example. Flowing alongside the mixing blade 53, the working fluid 11 and the materials 21 form a swirling flow, for example. As a result, the mixing of the materials 21 are accelerated. In FIG. 2 etc., the mixing blade 53 is shown in a simplified manner (the same is true of the support structures 55).

Figure 3:
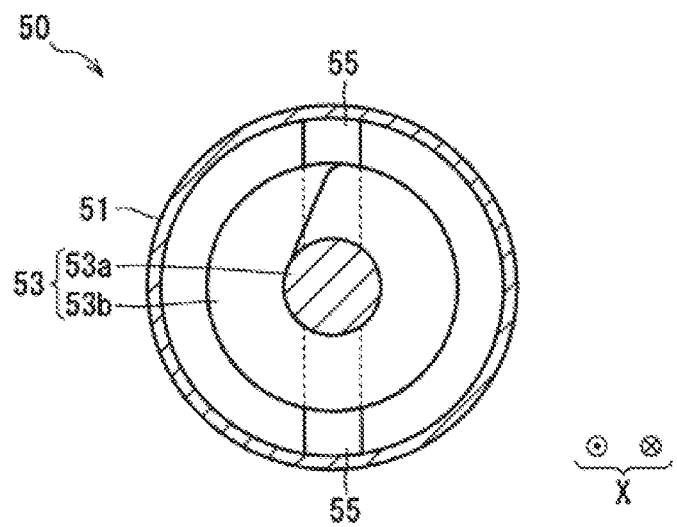
FIG. 3 is a sectional view, as viewed from the axial direction X, of the mixer shown in FIG. 2.
Figure 4:
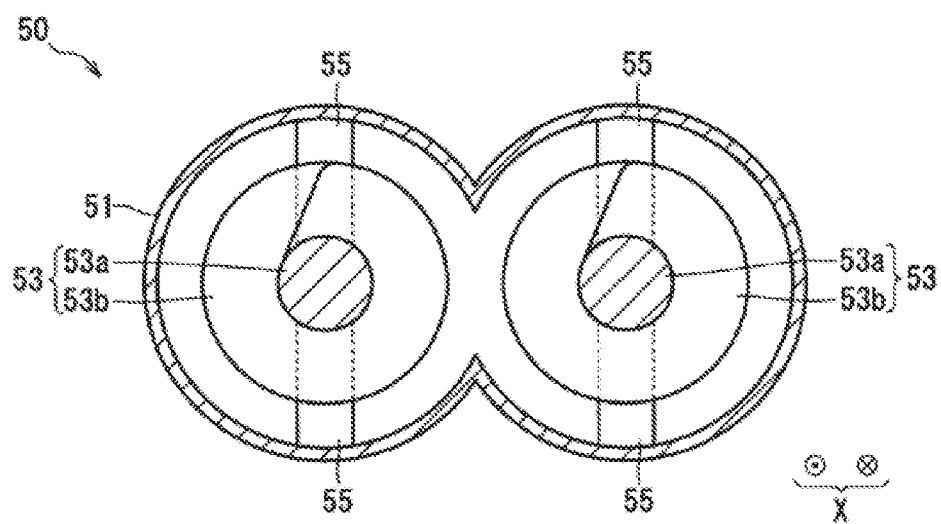
FIG. 4 is a sectional view corresponding to FIG. 3 of a case that two mixing blades like the one shown in FIG. 2 are provided.
Figure 5:
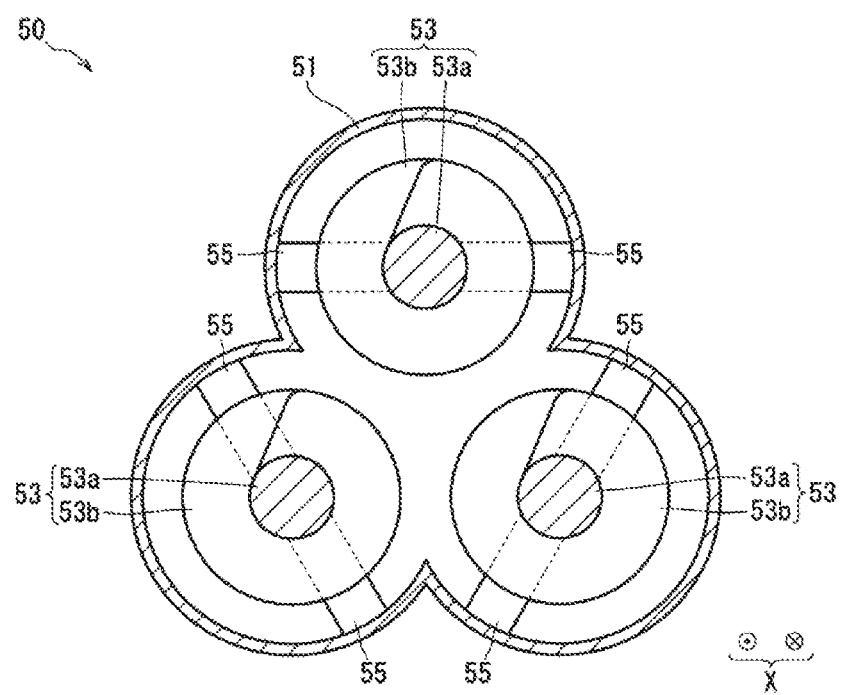
FIG. 5 is a sectional view corresponding to FIG. 3 of a case that three mixing blades like the one shown in FIG. 2 are provided.

Only one mixing blade 53 may be provided (one axis). Alternatively, plural mixing blades 53 may be provided (plural axes; two axes, three axes, or the like) (refer to FIG. 4 and FIG. 5). Where plural mixing blades 53 are provided, the materials 21 can be mixed more thoroughly than in the case where only one mixing blade 53 is provided. As shown in FIG. 3, an outer circumferential portion of the mixing blade 53 as viewed from the axial direction X (hereinafter referred to as an "outer circumferential portion of the mixing blade 53") and the inner surface of a cross section of the chamber 51 as viewed from the axial direction X (hereinafter referred to as a "cross-section inner surface of the chamber 51") have corresponding shapes (paired shapes). A gap is formed between the outer circumferential portion of the mixing blade 53 and the cross-section inner surface of the chamber 51. For example, the outer circumferential portion of the mixing blade 53 is shaped like a circle, an ellipse, or a shape that is close to a circle or an ellipse. The cross-section inner surface of the chamber 51 is shaped as follows. Example 1: Where only one mixing blade 53 is provided, the shape of the cross-section inner surface of the chamber 51 is similar to the shape of the outer circumferential portion of the mixing blade 53, for example, a circle, an ellipse, or a shape that is close to a circle or an ellipse. Example 2: Where plural mixing blades 53 are provided, the shape of the cross-section inner surface of the chamber 51 is a shape of an outer circumferential portion obtained by connecting outer circumferential portions of the plural mixing blades 53 in an overlapped manner. For example, the shape of the cross-section inner surface of the chamber 51 is a shape of an outer circumferential portion obtained by connecting plural circles, ellipses, or shapes that are close to circles or ellipses in an overlapped manner.

As shown in FIG. 3, the support structures 55 are structures for fixing the mixing blade 53 to the chamber 51 and having the former be supported by the latter. For example, the support structures 55 are members that extend inward in the radial direction (i.e., toward the shaft portion 53a) from the inner surface of the chamber 51.

Figure 2:
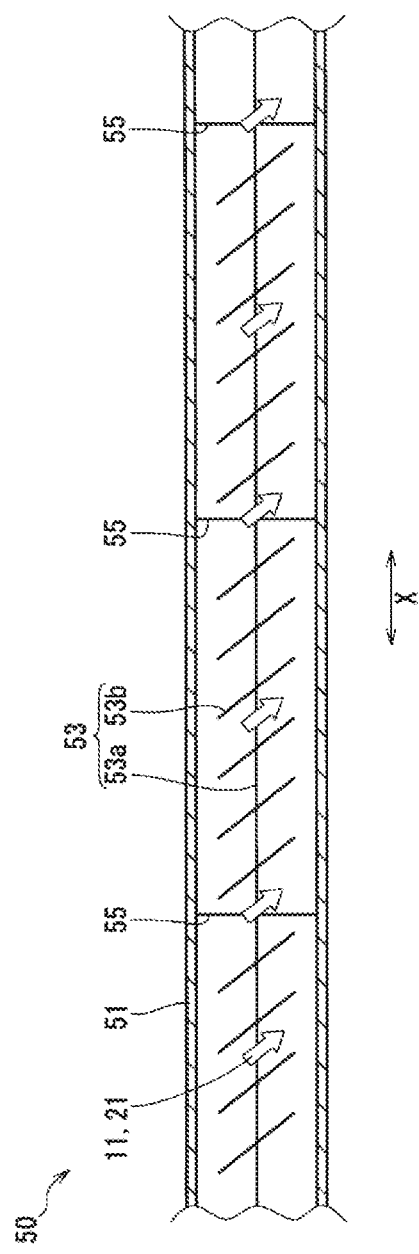
FIG. 2 is a sectional view, as viewed from a direction that is perpendicular to an axial direction X, of a mixer shown in FIG. 1.

As shown in FIG. 1, the sensors 57 detect inside states of the mixer 50. The sensors 57 are used for detecting a state of the working fluid 11 (i.e., whether it is in a supercritical state or a subcritical state). The sensors 57 may be used for detecting an amount (presence/absence, mixing state) of the materials 21 in the mixer 50. The sensors 57 may be used for controlling (adjusting) the flow rate Q of the working fluid 11 and the materials 21 in the mixer 50. The sensors 57 include pressure gauges and thermometers. The sensors 57 include a mixer entrance pressure gauge $57p1$, a mixer exit pressure gauge $57p2$, a mid-mixer pressure gauge $57p3$, a mixer entrance thermometer $57t1$, a mixer exit thermometer $57t2$, a mid-mixer thermometer $57t3$. The mixer entrance pressure gauge $57p1$ detects a pressure P1 at the entrance-side portion of the mixer 50. The mixer exit pressure gauge $57p2$ detects a pressure P2 at the exit-side portion of the mixer 50. The mid-mixer pressure gauge $57p3$ detects a pressure P3 at a portion (called a "middle portion") located downstream of the mixer entrance pressure gauge $57p1$ and upstream of the mixer exit pressure gauge $57p2$. Mid-mixer pressure gauges $57p3$ may be provided at plural positions (the same is true of mid-mixer thermometers $57t3$). The plural mid-mixer pressure gauges $57p3$ may be provided at positions that are spaced from each other in the axial direction X (the same is true of mid-mixer thermometers $57t3$). The mixer entrance thermometer $57t1$ detects a temperature T1 at the entrance-side portion of the mixer 50. The mixer exit thermometer $57t2$ detects a temperature T2 at the exit-side portion of the mixer 50. The mid-mixer thermometer $57t3$ detects a temperature T3 at the portion (called the "middle portion") located downstream of the mixer entrance thermometer $57t1$ and upstream of the mixer exit thermometer $57t2$.

The degree-of-opening adjustment valve 60 is used for controlling (adjusting) the pressure and the flow rate in the mixer 50. The degree-of-opening adjustment valve 60 adjusts the degree of opening of a flow passage for a fluid (working fluid 11 and materials 21) that is ejected from the mixer 50. For example, the degree-of-opening adjustment valve 60 may be provided at the exit of the chamber 51, downstream of the chamber 51, or in a flow passage that is connected to the exit of the chamber 51. Either one or plural degree-of-opening adjustment valves 60 may be provided.

The separation unit 70 is a unit for separating the working fluid 11 (fluid 12) from the materials 21 dissolved in the working fluid 11. The separation unit 70 is provided downstream of the mixing unit 40, the mixer 50, and the degree-of-opening adjustment valve 60. The separation unit 70 includes a separator 71 and a pressure adjustment valve 73.

The separator 71 separates the working fluid 11 from the materials 21 (devolatilization). The separator 71 separates the working fluid 11 from the materials 21 by lowering the pressure of the working fluid 11 and the materials 21 and thereby vaporizing the working fluid 11 (producing a gas-form fluid 12). As a result, the separator 71 deposits the materials 21. The separator 71 includes an opening portion 71a. The opening portion 71a ejects the materials 21 from which a working fluid 11 has been separated. The opening portion 71a is a lid, capable of being opened and closed (movable opening/closing portion), of the separator 71. When the opening portion 71a is closed, it is airtight. The opening portion 71a ejects the materials 21 intermittently (described later in detail). The opening portion 71a ejects the materials 21 downward (i.e., drops materials 21).

The pressure adjustment valve 73 adjusts the degree of opening of the flow passage through which a working fluid 11 (i.e., gas-form fluid 12) separated from the materials 21 passes. The pressure adjustment valve 73 adjusts the pressure at a position upstream of itself. The pressure adjustment valve 73 adjusts the pressure in the separator 71. For example, the pressure adjustment valve 73 may be provided at the exit of the separator 71, downstream of the separator 71, or in the flow passage (devolatilization flow passage) that is connected to the exit of the separator 71. Either only one or plural pressure adjustment valves 73 may be provided. It is preferable that a gas-form fluid 12 that has passed through the pressure adjustment valve 73 flow into the production unit 10 (e.g., cooler 15) (so as to be used again).

The carry-out unit 90 is a unit for carrying out the materials 21 to the next process. The next process is a process located next to the process using the mixing apparatus 1. The carry-out unit 90 may include a belt conveyor, for example. For example, the apparatus of the next process may be an apparatus for manufacturing pellets (i.e., pelletizer) or an apparatus for manufacturing sheets (e.g., sheet extruder). The materials 21 may be carried out to the next process directly from the separation unit 70, that is, without passing through the carry-out unit 90.

The control unit C performs input/output of signals, computation (judgment, calculation, etc.), control of devices, etc. Detection results of the sensors 57 are input to the control unit C. For example, the control unit C controls the operations of the production unit 10, the storage unit 20, the dissolving unit 30, the mixing unit 40, the separation unit 70, and the carry-out unit 90.

(Operations)

Figure 6:
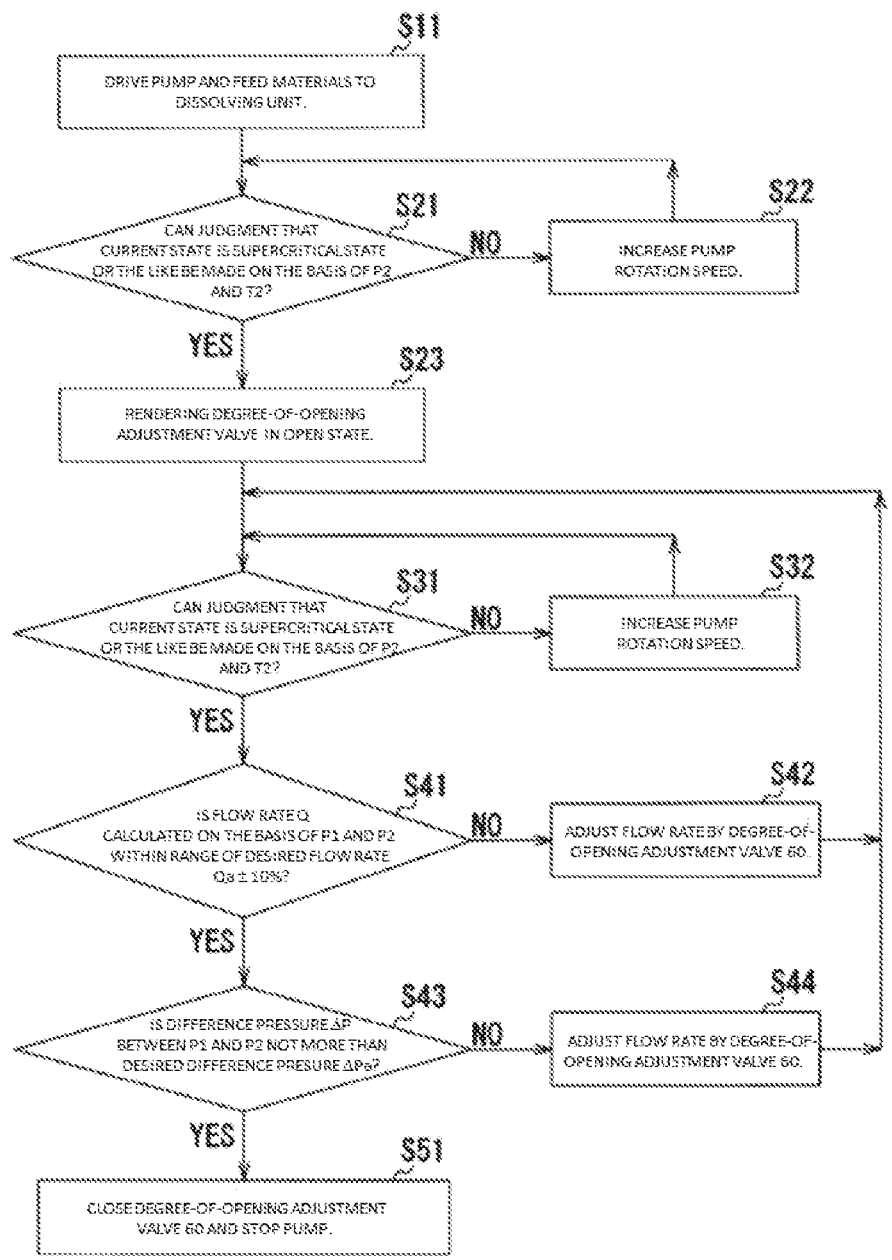
FIG. 6 is a flowchart showing how the mixing apparatus shown in FIG. 1 operates.

How the mixing apparatus 1 operates is described by mainly referring to a flowchart shown in FIG. 6. The individual constituent elements of the above-described mixing apparatus 1 is described by mainly referring to FIG. 1. In the following, how the mixing apparatus 1 operates is described in order. The order of operations may be changed.

(Dissolving of Materials 21 in Working Fluid 11 and Related Operations)

The pump 16 is driven and materials 21 are fed into the dissolving unit 30 (step S11). The details of this step are as follows. When the pump 16 is driven, a working fluid 11 flows into the dissolving unit 30 from the production unit 10 (through pressurization). Furthermore, materials 21 are fed into the dissolving unit 30 through the outlets of the storage unit 20. At this time, the degree-of-opening adjustment valve 60 is closed fully. The pressures in the dissolving unit 30 and the mixing unit 40 are increased by increasing the rotation speed of the pump 16.

(Judgment of State of Working Fluid 11)

Then it is judged whether the working fluid 11 is in a supercritical state or the like (step S21). This judgment is made by the control unit C. Likewise, other judgments are made by the control unit C. The following description is made of a case that a state of the working fluid 11 at the exit-side portion of the mixer 50 is judged. A state of the working fluid 11 at a portion other than the exit-side portion of the mixer 50 may be judged. It is preferable that judgment be made at more portions. It is judged (through comparison) whether the pressure P2 is higher than or equal to a desired pressure Pa and the temperature T2 is higher than or equal to a desired temperature Ta. The desired pressure Pa and the desired temperature Ta are set in the control unit C in advance. Where the working fluid 11 should be rendered in a supercritical state, the desired pressure Pa is the critical pressure and the desired temperature Ta is the critical temperature. Where the working fluid 11 should be rendered in a subcritical state, the desired pressure Pa and the desired temperature Ta are a pressure and a temperature at which the working fluid 11 is rendered in a subcritical state. If the pressure P2 is higher than or equal to the desired pressure Pa and the temperature T2 is higher than or equal to the desired temperature Ta (yes), it is judged that the working fluid 11 is in a supercritical state or the like and the process moves to the next step S23. If the pressure P2 is lower than the desired pressure Pa or the temperature T2 is lower than the desired temperature Ta (no), it is judged that the working fluid 11 is not in a supercritical state or the like. In this case, the pressure and the temperature of the working fluid 11 are increased until the pressure P2 becomes higher than or equal to the pressure Pa and the temperature T2 becomes higher than or equal to the temperature Ta. More specifically, the rotation speed of the pump 16 is increased (step S22).

(Start of Flowing of Materials 21 etc.)

Subsequently, the degree-of-opening adjustment valve 60 is set to an open state (step S23). It is preferable that at this time the degree-of-opening adjustment valve 60 is opened gradually from the closed state. The term "open state" means a state that degree-of-opening adjustment valve 60 is on the open side of the fully closed state; for example, the open state may be a fully open state or a state between the fully open state and the fully closed state. When the degree-of-opening adjustment valve 60 is rendered in an open state, the materials 21 are mixed together while flowing downstream through the mixer 50 and then flow into the separator 71 from the mixer 50.

(Deposition of Materials 21)

The working fluid 11 and the materials 21 flow into the separator 71 with the opening portion 71a of the separator 71 and the pressure adjustment valve 73 closed. Then the pressure adjustment valve 73 is rendered in an open state. As a result, the working fluid 11 is vaporized and the working fluid 11 (fluid 12) is devolatilised from the materials 21. It is preferable that at this time the pressure adjustment valve 73 be opened gradually. With this measure, the pressure in the separator 71 lowers gradually. As a result, bubble formation due to quick pressure reduction and resulting generation of noise can be suppressed. The opening portion 71a is thereafter opened. As a result, deposited materials 21 (i.e., materials 21 from which a working fluid 11 has been separated) are ejected from the separator 71. The opening portion 71a is then closed. In this manner, the opening portion 71a ejects materials 21 intermittently (what is called a semi-batch type operation), (Judgment of State of Working Fluid 11)

As described above, the pressure in the mixer 50 lowers when each of the degree-of-opening adjustment valve 60 and the pressure adjustment valve 73 is rendered in an open state. If at this time the state that the working fluid 11 is in a supercritical state or the like is canceled, materials 21 are deposited in the mixer 50 and the flow passage in the mixer 50 may be clogged. To prevent the flow passage in the mixer 50 from being clogged, the working fluid 11 needs to be kept in a supercritical state or the like. Thus, the state of the working fluid 11 is judged again (step S31). This judgment is made at least at one of the entrance-side portion, the middle portion, and the exit-side portion. For example, the same judgment as made at step S21 is made. If the pressure P2 is higher than or equal to the desired pressure Pa and the temperature T2 is higher than or equal to the desired temperature Ta (yes), it is judged that the working fluid 11 is in a supercritical state or the like and the process moves to the next step S41. If the pressure P2 is lower than the desired pressure Pa or the temperature T2 is lower than the desired temperature Ta (no), it is judged that the working fluid 11 is not in a supercritical state or the like. In this case, the pressure and the temperature of the working fluid 11 are increased until the pressure P2 becomes higher than or equal to the pressure Pa and the temperature T2 becomes higher than or equal to the temperature Ta (step S32 which is the same as step S22).

(Judgment of Differential Pressure ΔP and Flow Rate Q)

A flow rate of the working fluid 11 and the materials 21 flowing through the mixer 50 is judged (step S41). More specifically, a flow rate Q is calculated on the basis of the differential pressure ΔP between the pressure P1 and the pressure P2. It is then judged whether the flow rate Q is within a prescribed range (the term "prescribed range" means a predetermined proper range (regular range); the same applies to the following description). Whether the differential pressure ΔP is within a prescribed range may be judged without calculating a flow rate Q. The prescribed range of the flow rate Q (or the prescribed range of the differential pressure ΔP) is set in the control unit C in advance. The prescribed range is set to a range where the working fluid 11 can be kept in a supercritical state or the like. More specifically, for example, it is judged whether the flow rate Q is within a range of the desired flow rate Qa±10% (prescribed range). Alternatively, it may be judged whether the differential pressure ΔP is within a range of a desired differential pressure ±10%. If the flow rate Q (or differential pressure ΔP) is within the prescribed range (yes), the process moves to the next step S43. If the flow rate Q (or differential pressure ΔP) is not within the prescribed range (no), the next control is performed. In this case, the differential pressure ΔP is controlled so as to fall within the prescribed range. As a result, the flow rate Q is controlled so as to fall within the prescribed range. The differential pressure ΔP is controlled (the flow rate Q is controlled) by controlling the degree of opening of the degree-of-opening adjustment valve 60. The differential pressure ΔP may be controlled by controlling the rotation speed of the pump 16 in place of or in addition to the control of the degree of opening of the degree-of-opening adjustment valve 60.

(Judgment of Residual Materials 21)

An amount of materials 21 remaining in the mixer 50 is judged (step S43). More specifically, the amount of materials 21 remaining in the mixer 50 (residual materials) becomes small when the mixing in the mixer 50 has come close to the end. As a result, the sectional area of the flow passage in the mixer 50 increases, the pressure loss in the mixer 50 decreases, and the differential pressure ΔP becomes small. Thus, it is judged whether the differential pressure ΔP is smaller than or equal to a desired differential pressure ΔPa. The desired differential pressure ΔPa is set in the control unit C in advance. If the differential pressure ΔP is larger than the desired differential pressure ΔPa (no), it is judged that an amount of materials 21 remaining in the mixer 50 is larger than a prescribed amount. In this case, the flow rate Q is adjusted as necessary (step S44 which is the same as step S42) and the mixing is continued. In this case, for example, the process returns to step S31. If the differential pressure ΔP is larger than the desired differential pressure ΔPa (yes), it is judged that an amount of materials 21 remaining in the mixer 50 is smaller than or equal to the prescribed amount. In this case, the mixing in the mixer 50 is finished (step S51). More specifically, the degree-of-opening adjustment valve 60 is closed and the pump 16 is stopped.

(Comparison with Rotary Blade)

An apparatus that mixes materials together without using a supercritical fluid or the like has the following problems, for example. In such apparatuses, a rotary blade is rotated with respect to a chamber and shearing forces are applied to the materials, whereby the materials are caused to heat (shearing heating) and melt and melted materials are mixed together. In this case, shearing heat generated in the materials causes problems that the materials are degraded and the energy efficiency is low. For example, where the materials include a polymer (rubber, resin, or the like) that is formed by entangled molecular chains, molecular chains of the materials may be cut when the materials receive strong shearing forces. Cutting of molecular chains leads to degradation of the materials. On the other hand, in apparatuses that mix materials together using a supercritical fluid or the like, it is not necessary to melt the materials by shearing heating because the materials are melted in the supercritical fluid or the like. Thus, such apparatuses are free of the problems that the materials are degraded and the energy efficiency is low.

Even among apparatuses that mix materials together using a supercritical fluid or the like, apparatuses that mix materials together by a rotary blade that rotate with respect to a chamber have the following problem, for example. In such apparatuses, a drive device for rotating the rotary blade is provided outside the chamber. It is conceivable that the drive device outside the chamber and the rotary blade in the chamber are connected to each other by, for example, a shaft portion of the rotary blade. Thus, there is a problem of fluid leakage through, for example, the gap between the chamber and the shaft portion of the rotary blade (the problem relating to sealing performance). The problem relating to sealing performance is particularly serious because the inside of the chamber is in a high pressure state (i.e., a state that the pressure is higher than atmospheric pressure) such as a supercritical state or the like. On the other hand, in this embodiment, since the mixing blade 53 is fixed to the chamber 51, it is possible to avoid the above problem relating to sealing performance. The mixing apparatus 1 according to this embodiment may be provided with a rotary blade (refer to a ninth embodiment).

(Rotation Speed of Pump 16)

It is preferable that the rotation speed of the pump 16 can be varied (i.e., increased and decreased). It is preferable the control of the rotation speed of the pump 16 be inverter control. Where the rotation speed of the pump 16 is varied, the working fluid 11 and the materials 21 are compressed and expanded repeatedly (causing a pressure variation and a pumping effect). This makes it possible to cause an extensional flow in addition to a shear flow in the working fluid 11 and the materials 21 and hence to mix the materials 21 more thoroughly. For example, where the materials 21 include a fiber material (e.g., CNF), entangled fibers can be defibrated by the above-mentioned pumping effect.

The mixing apparatus 1 shown in FIG. 1 provides the following advantages.

(Advantages of First Aspect of Invention)

The mixing apparatus 1 includes the mixer 50. The mixer 50 mixes materials 21 including a rubber or a resin in the presence of a working fluid 11 being in a supercritical state or a subcritical state. The mixer 50 includes the chamber 51 and the mixing blade 53. The chamber 51 forms a flow passage for the working fluid 11 and the materials 21.

[Configuration 1] The mixing blade 53 is disposed in and fixed to the chamber 51.

The mixing apparatus 1 has the above [Configuration 1]. Thus, the mixing apparatus 1 can dispense with energy for rotating the mixing blade 53 with respect to the chamber 51. Furthermore, it is not necessary to form a gap between members for rotating the mixing blade 53 with respect to the chamber 51 and the chamber 51. This makes it possible to give necessary sealing performance to the chamber 51.

The above [Configuration 1] may provide the following advantages. The heat generated by the friction between the mixing blade 53 and the materials 21 can be made smaller than in a case that the mixing blade 53 is rotated with respect to the chamber 51. Thus, the temperature increase of the materials 21 being mixed together can be suppressed. As a result, the degradation of the materials 21 by heat can be suppressed. This makes it possible to increase the kinds of materials 21 that can be mixed together. More specifically, for example, even materials that are less resistant to heat (e.g., plant-origin materials such as CNF) than metal materials etc. can be subjected to mixing by the mixer 50. Furthermore, where the mixing blade 53 is formed so as to rotate the working fluid 11, the following advantages may be provided. Since the heat generated by the friction between the mixing blade 53 and the materials 21 is reduced, the rotation speed during kneading can be increased to raise the kneading efficiency of the materials 21.

(Advantage of Second Aspect of Invention)

[Configuration 2] The mixing apparatus 1 includes the separator 71. The separator 71 is disposed downstream of the mixer 50 and separates the working fluid 11 (fluid 12) from the materials 21.

The above [Configuration 2] makes it possible to deposit materials 21 in the separator 71 which is disposed downstream of the mixer 50. Thus, it is not necessary to separate (devolatilize) the working fluid 11 from the materials 21 in the mixer 50.

The details of this advantage are as follows. Where the materials 21 are mixed together by a rotary blade that rotates with respect to the chamber 51 unlike in the embodiment, deposited materials 21 can be pushed out to the downstream side by the rotary blade even if devolatilization is performed in the mixer 50. Thus, deposited materials 21 do not clog the mixer 50. On the other hand, in the embodiment, the mixing blade 53 is fixed to the chamber 51 (above [Configuration 1]). Thus, if devolatilization is performed in the mixer 50, deposited materials 21 may clog in the mixer 50. However, since the mixing apparatus 1 has the above [Configuration 2]. It is not necessary to perform volatilization in the mixer 50. Thus, clogging of the mixer 50 by deposited materials 21 can be suppressed.

The above [Configuration 2] may provide the following advantage. A working fluid 11 (fluid 12) separated by the separator 71 is reused easily.

(Advantages of Third Aspect of Invention)

[Configuration 3] The mixing apparatus 1 includes the pressure adjustment valve 73. The pressure adjustment valve 73 adjusts the degree of opening of the flow passage through which a working fluid 11 (fluid 12) separated from the materials 21 is to pass.

The above [Configuration 3] makes it possible to adjust the pressure in the separator 71. Thus, the use of the pressure adjustment valve 73 makes it possible to lower the pressure of the working fluid 11 and the materials 21 gradually (smoothly) and to cause devolatilization gradually. This makes it possible to suppress bubble formation due to quick pressure reduction (i.e., volatilization in a short time) and resulting generation of noise. Furthermore, energy loss (useless energy consumption) due to generation of noise can be suppressed.

(Advantage of Fourth Aspect of Invention)

[Configuration 4] The separator 71 includes the opening portion 71a for ejecting the materials 21 intermittently from which a working fluid 11 has been separated.

The above [Configuration 4] makes it easier to eject the materials 21 from the separator 71 after devolatilization is completed properly.

(Advantages of Fifth Aspect of Invention)

[Configuration 5] The mixing apparatus 1 includes the degree-of-opening adjustment valve 60 for adjusting the degree of opening of the flow passage through which a fluid (working fluid 11 and materials 21) ejected from the mixer 50 is to pass.

The above [Configuration 5] makes it possible to adjust the flow rate of the working fluid 11 and the materials 21 in the mixer 50, (Advantages of Sixth Aspect of Invention)

[Configuration 6] The mixer 50 includes the mixer entrance pressure gauge 57$p$1, the mixer entrance thermometer 57$t$1, the mixer exit pressure gauge 57$p$2, and the mixer exit thermometer 57$t$2. The mixer entrance pressure gauge 57$p$1 detects a pressure at the entrance-side portion of the mixer 50. The mixer entrance thermometer 57$t$1 detects a temperature at the entrance-side portion of the mixer 50. The mixer exit pressure gauge 57$p$2 detects a pressure at the exit-side portion of the mixer 50. The mixer exit thermometer 57$t$2 detects a temperature at the exit-side portion of the mixer 50.

With the above [Configuration 6], pressures P1 and P2 and temperatures T1 and T2 in the mixer 50, that is, at the entrance-side portion and the exit-side portion of the mixer 50, are detected. Thus, states of the working fluid 11 (i.e., whether the working fluid 11 is in a supercritical state or the like) at the entrance-side portion and the exit-side portion of the mixer 50 can be judged. Furthermore, with the above [Configuration 6], since pressures P1 and P2 at the entrance-side portion and the exit-side portion of the mixer 50 are detected, respectively, a differential pressure $\Delta P$ between the pressures P1 and P2 at the entrance-side portion and the exit-side portion of the mixer 50 can be detected, as a result of which a flow rate Q in the mixer 50 can be detected. Thus, information relating to the flow rate Q can be used for controlling the flow rate Q in the mixer 50. The detection of a differential pressure $\Delta P$ also makes it possible to detect an amount of materials 21 remaining in the mixer 50.

(Advantage of Seventh Aspect of Invention)

[Configuration 7] The mixing apparatus 1 (control unit C) controls the differential pressure $\Delta P$ between a pressure P1 detected by the mixer entrance pressure gauge 57$p$1 and a pressure P2 detected by the mixer exit pressure gauge 57$p$ so that the differential pressure $\Delta P$ falls within a prescribed range.

With the above [Configuration 7], the differential pressure $\Delta P$ between the pressures P1 and P2 at the entrance-side portion and the exit-side portion of the mixer 50 falls within a prescribed range. This makes it possible to have the flow rate Q in the mixer 50 fall within a prescribed range.

(Advantages of Eighth Aspect of Invention)

[Configuration 8] The mixer 50 includes the mid-mixer pressure gauge 57$p$3 and the mid-mixer thermometer 57$t$3. The mid-mixer pressure gauge 57$p$3 detects a pressure at the portion (middle portion) located downstream of the mixer entrance pressure gauge 57p1 and upstream of the mixer exit pressure gauge 57p2. The mid-mixer thermometer 57t3 detects a temperature at the portion (middle portion) located downstream of the mixer entrance thermometer 57t1 and upstream of the mixer exit thermometer 57t2.

The above [Configuration 8] makes it possible to detect whether the working fluid 11 is in a supercritical state or the like at the entrance-side portion, the exit-side portion, and the middle portion of the mixer 50. Furthermore, the above [Configuration 8] makes it possible to detect the differential pressure between a pressure P1 at the entrance-side portion and a pressure P3 at the middle portion of the mixer 50 and the differential pressure between the pressure P3 at the middle portion and a pressure P2 at the exit-side portion of the mixer 50. As a result, a flow rate Q in the mixer 50 can be detected with higher accuracy.

Furthermore, an amount of materials 21 remaining in the mixer 50 can be detected with higher accuracy, (Advantages of Ninth Aspect of Invention)

[Configuration 9] The mixing apparatus 1 includes the pump 16 for sending out the working fluid 11 to the mixer 50. The rotation speed of the pump 16 is inverter-controlled.

The above [Configuration 9] makes it possible to vary the rotation speed of the pump 16 easily. When the rotation speed of the pump 16 is varied, the working fluid 11 and the materials 21 are compressed and expanded repeatedly (causing a pressure variation and a pumping effect). This makes it possible to cause an extensional flow in addition to a shear flow in the working fluid 11 and the materials 21 and hence to mix the materials 21 more thoroughly. This may provide the following advantage. For example, where the materials 21 include a fiber material (e.g., CNF), entangled fibers can be defibrated by the above-mentioned pumping effect.

Second Embodiment

Differences of a mixing apparatus 201 according to a second embodiment from the mixing apparatus according to the first embodiment is described with reference to FIG. 7. Constituent elements, having the same ones in the first embodiment, of the mixing apparatus 201 according to the second embodiment is not described by, for example, giving the former the same symbols as the latter. Likewise, common constituent elements is not described in the other embodiments. A dissolving unit 230 and a mixer 250 are inclined with respect to the horizontal direction.

The mixer 250 is inclined with respect to the horizontal direction (hereinafter referred to simply as "inclined") so that the materials 21 go down from the upstream side to the downstream side of the working fluid 11 and the materials 21. The chamber 51 (see FIG. 2) and the mixing blade 53 (see FIG. 2) are inclined. Either the whole of the mixer 250 or only a part of it may be inclined. A dissolving unit 230 is inclined like the mixer 250. Where the mixer 250 is inclined, the dissolving unit 230 need not always be inclined. Although in the example shown in FIG. 7 neither the mid-mixer pressure gauge 57p3 (see FIG. 1) nor the mid-mixer thermometer 57t3 (see FIG. 1) is provided, they may be provided.

Figure 7:
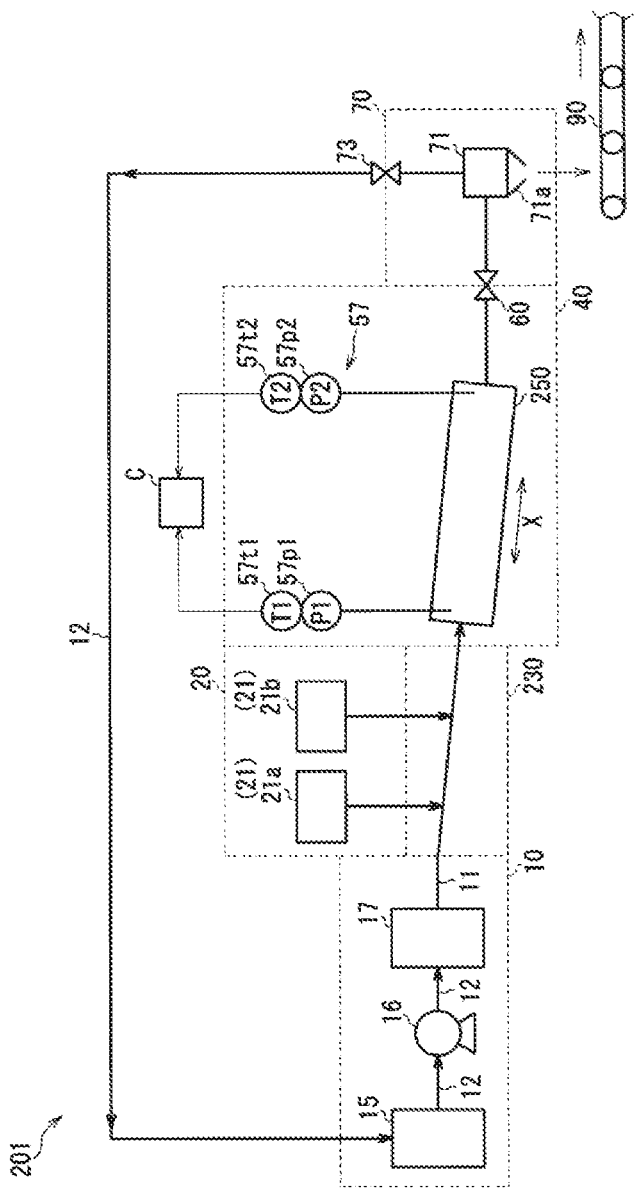
FIG. 7 is a block diagram, corresponding to FIG. 1, of a mixing apparatus according to a second embodiment.

The mixing apparatus 201 shown in FIG. 7 provides the following advantages.

(Advantages of 10th Aspect of Invention)

[Configuration 10] The mixer 250 is inclined respect to the horizontal direction so that the materials 21 go down from the upstream side to the downstream side of the materials 21.

With the above [Configuration 10], the materials 21 tend to flow toward the downstream side in the mixer 250 due to gravity (i.e., their own weights). The details of this advantage are as follows. Where unlike in this embodiment materials are mixed together by a rotary blade that rotates with respect to a chamber, materials are not prone to be left in the mixer because the rotary blade can carry the materials toward the downstream side. On the other hand, in this embodiment, the mixing blade 53 is fixed to the chamber 51 (refer to the above [Configuration 1]). Thus, materials 21 may remain in the mixer 250. In view of this, the mixing apparatus 201 has the above [Configuration 10]). As a result, materials 21 are not prone to remain in the mixer 250.

Furthermore, since the materials 21 tend to flow toward the downstream side in the mixer 250, the motive power for causing the working fluid 11 and the materials 21 to flow toward the downstream side (e.g., the motive power of the pump 16) can be suppressed.

Third Embodiment

Figure 8:
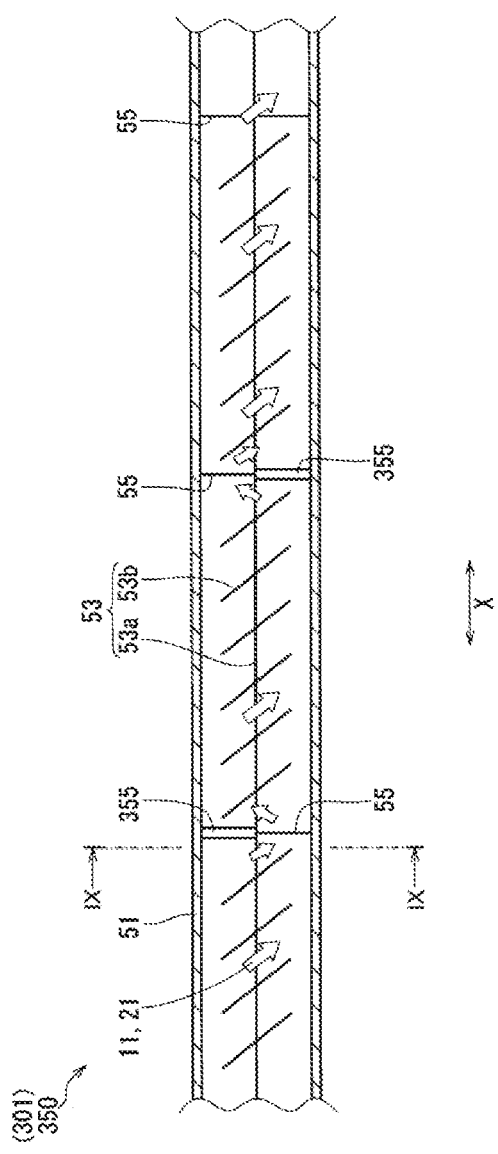
FIG. 8 is a sectional view, corresponding to FIG. 2, of a mixer of a mixing apparatus according to a third embodiment.
Figure 9:
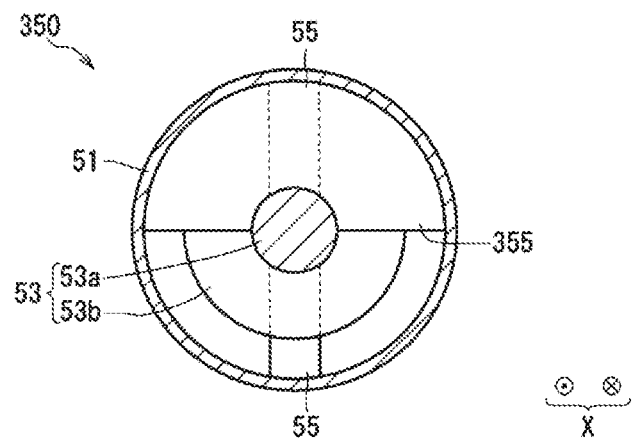
FIG. 9 is a sectional view, taken along an arrowed line IX-IX, of FIG. 8.
Figure 10:
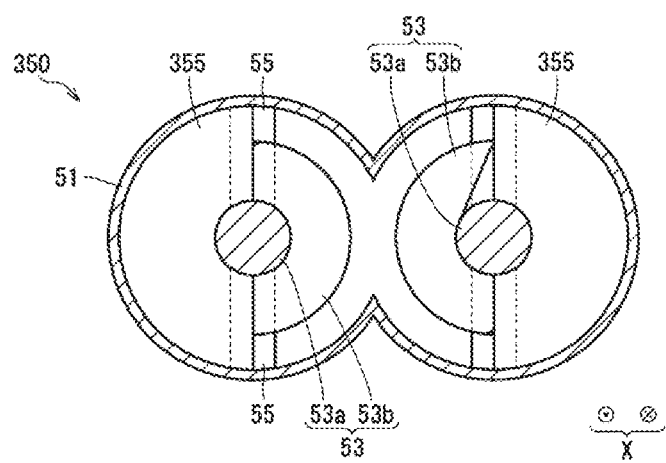
FIG. 10 is a sectional view corresponding to FIG. 9 in a case that two mixing blades like the one shown in FIG. 9 are provided.

Differences of a mixer 350 of a mixing apparatus 301 according to a third embodiment from the mixer employed in the first embodiment is described with reference to FIGS. 8 to 10. As shown in FIG. 8, the mixer 350 includes mixing acceleration members 355.

The mixing acceleration members 355 are members for accelerating the mixing of materials 21. The mixing acceleration members 355 are fixed to the chamber 51, block a part of the flow passage in the chamber 51, and are provided separately from the mixing blade 53. The mixing acceleration members 355 are shaped like plates (mixing acceleration plates), for example. In this case, the thickness direction of the plate-like mixing acceleration members 355 is the axial direction X of the chamber 51, for example. The mixing acceleration members 355 need not always be shaped like plates and may be shaped like blocks, for example. For example, the mixing acceleration members 355 project from the inner surface of the chamber 51 toward the center axis of the chamber 51. The mixing acceleration members 355 may project from a top portion of the inner surface of the chamber 51 toward its bottom portion (see FIG. 9) or from a bottom portion of the inner surface of the chamber 51 toward its top portion. As shown in FIG. 10, the mixing acceleration members 355 may project from the inner surface of the chamber 51 from the outside toward the inside in the horizontal direction.

As shown in FIG. 8, because of the provision of the mixing acceleration members 355, the working fluid 11 and the materials 21 come to flow clear of the mixing acceleration members 355. As a result, the flow passage in the mixer 350 tends to become complex (the flow passage tends to vary and replacement of materials 21 is accelerated), whereby the materials 21 are mixed together more thoroughly. For example, assume that the materials 21 flow through the mixer 350 so as to rotate spirally alongside the mixing blade 53. In this case, the materials 21 tend to be distributed (i.e., gather) more in the vicinity of the inner surface of the chamber 51 because of centrifugal force and flow near and alongside the inner surface of the chamber 51. When flowing in this manner and coming close to a mixing acceleration member 355, materials 21 then flow clear of the mixing acceleration member 355. Thus, the materials 21 move toward the center axis of the chamber 51. In this manner, the flowing direction of the materials 21 vary in a complicated manner in the vicinity of the mixing acceleration members 355, whereby mixing of the materials 21 is accelerated.

Furthermore, the provision of the mixing acceleration members 355 causes pressure losses in the flow passage in the mixer 350 and a pumping effect (mentioned above) on the working fluid 11 and the materials 21. This makes it possible to cause an extensional flow in addition to a shear flow in the working fluid 11 and the materials 21, whereby the materials 21 can be mixed together more thoroughly. For example, where the materials 21 include a fiber material (e.g., CNF), the above pumping effect makes it possible to defibrate entangled fibers.

The mixing apparatus 301 shown in FIG. 8 provides the following advantages.

(Advantages of 11th Aspect of Invention)

[Configuration 11] The mixer 350 includes the mixing acceleration members 355. The mixing acceleration members 355 are fixed to the chamber 51, block a part of the flow passage in the chamber 51, and is provided separately from the mixing blade 53.

With the above [Configuration 11], the flow passage for the materials 21 can be made complex, whereby the materials 21 can be mixed together more thoroughly.

Fourth Embodiment

Differences of a mixer 450 of a mixing apparatus 401 according to a fourth embodiment from the mixer employed in the first embodiment is described with reference to FIG. 11. The mixer 450 of the mixing apparatus 401 includes a chamber 451.

The sectional area of the chamber 451 as viewed from the axial direction X varies depending on the position in the axial direction X. For example, a portion where the sectional area of the chamber 451 decreases gradually and a portion where the sectional area of the chamber 451 increases gradually are arranged alternately from the upstream side to the downstream side in the axial direction X. In this case, the working fluid 11 and the materials 21 are compressed and expanded repeatedly (a pumping effect occurs) and they accelerate and decelerate repeatedly. This makes it possible to cause an extensional flow in addition to a shear flow in the working fluid 11 and the materials 21, whereby the materials 21 can be mixed together more thoroughly. For example, where the materials 21 include a fiber material (e.g., CNF), the above pumping effect makes it possible to defibrate entangled fibers.

Figure 11:
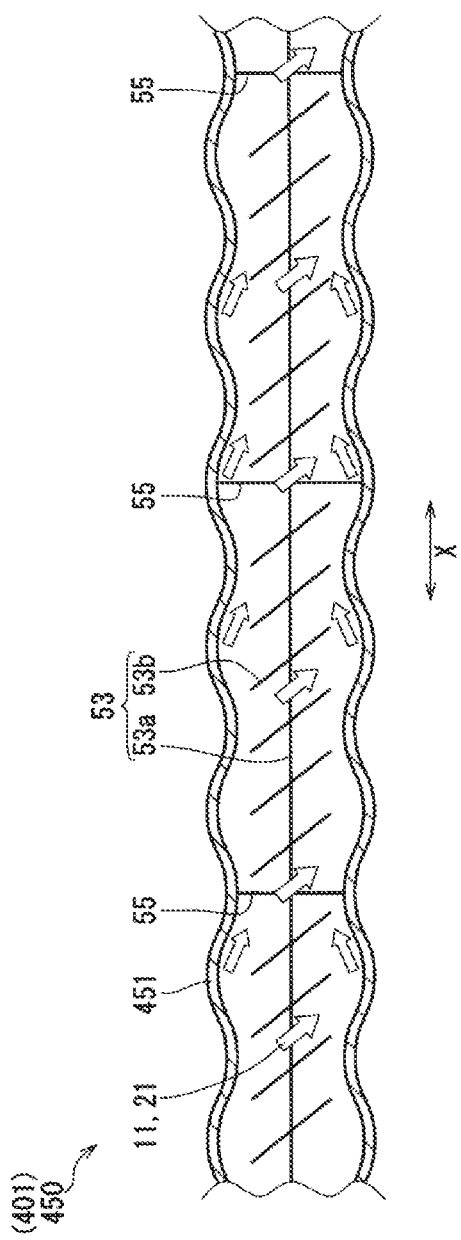
FIG. 11 is a sectional view, corresponding to FIG. 2, of a mixer of a mixing apparatus according to a fourth embodiment.

The mixing apparatus 401 shown in FIG. 11 provides the following advantages.

(Advantages of 12th Aspect of Invention)

[Configuration 12] The sectional area of the chamber 451 as viewed from the axial direction X of the chamber 451 varies depending on the position in the axial direction X in the chamber 451.

With the above [Configuration 12], the pressure acting on the materials 21 varies as the working fluid 11 and the materials 21 flow through the chamber 451. As a result, the materials 21 can be mixed together more thoroughly.

Fifth Embodiment

Differences of a mixer 550 of a mixing apparatus 501 according to a fifth embodiment from the mixer employed in the first embodiment is described with reference to FIG. 12. The mixer 550 of the mixing apparatus 501 includes a chamber 551.

A line obtained by connecting the centers of cross sections, as viewed from the axial direction X, of the chamber 51 is referred to as a cross section center line 551a. The cross section center line 551a is shaped like a curved line or a polygonal line. At least one of the vertical position and the horizontal position of the cross section center line 551a varies depending on the position in the axial direction X. For example, the cross section center line 551a snakes in the vertical direction. For example, the cross section center line 551a may snake in the horizontal direction. The cross section center line 551a may snake in a direction that is inclined with respect to the vertical direction and the horizontal direction. The cross section center line 551a may be shaped like a spiral. The cross section center line 551a need not always snake. Where the cross section center line 551a is shaped like a curved line or a polygonal line, the sectional area, as viewed from the axial direction X, of the chamber 551 may either vary depending on the position in the axial direction X or kept the same (kept constant).

Figure 12:
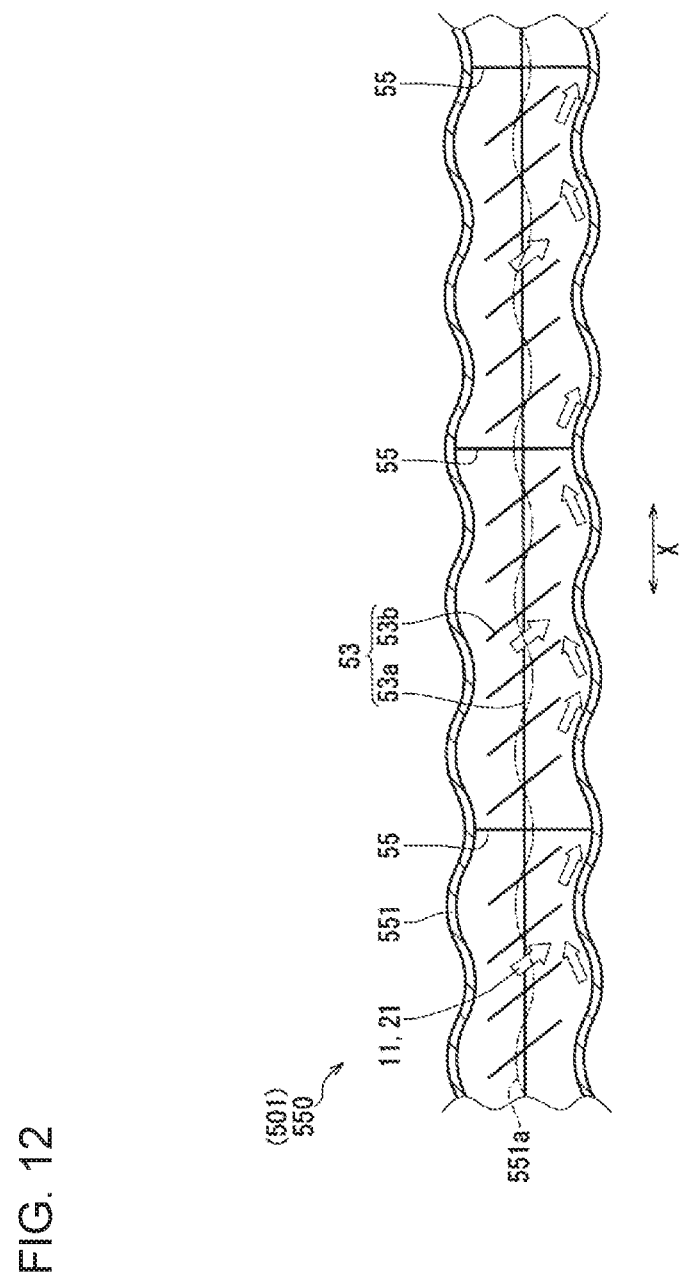
FIG. 12 is a sectional view, corresponding to FIG. 2, of a mixer of a mixing apparatus according to a fifth embodiment.

The mixing apparatus 501 shown in FIG. 12 provides the following advantages.

(Advantages of 13th Aspect of Invention)

[Configuration 13] The line (cross section center line 551a) obtained by connecting the centers of cross sections, as viewed from the axial direction X of the chamber 551, of the chamber 551 is shaped like a curved line or a polygonal line.

With above [Configuration 13], a flow passage for the materials 21 is made more complex than in the case where the cross section center line 551a is straight, whereby the materials 21 can be mixed together more thoroughly.

Sixth Embodiment

Differences of mixing blades 653 etc. of a mixer 650 of a mixing apparatus 601 according to a sixth embodiment from the mixing blade etc. employed in the first embodiment is described with reference to FIG. 13.

The mixing blades 653 are arranged at intervals in the axial direction X. The mixing blades 653 are arranged in the axial direction X in such a manner that intervals (gap regions A) are formed between them. In each gap region A, a flow passage for the materials 21 tends to become complex (the flow passage tends to vary and replacement of materials is accelerated). In FIG. 13, the support structures 55 (see FIG. 2 etc.) are not shown. The mixing acceleration members 355 (see FIG. 1) may be disposed in the respective gap regions A. In this case, the mixing acceleration members 355 can be disposed in the respective gap regions A easily.

Figure 13:
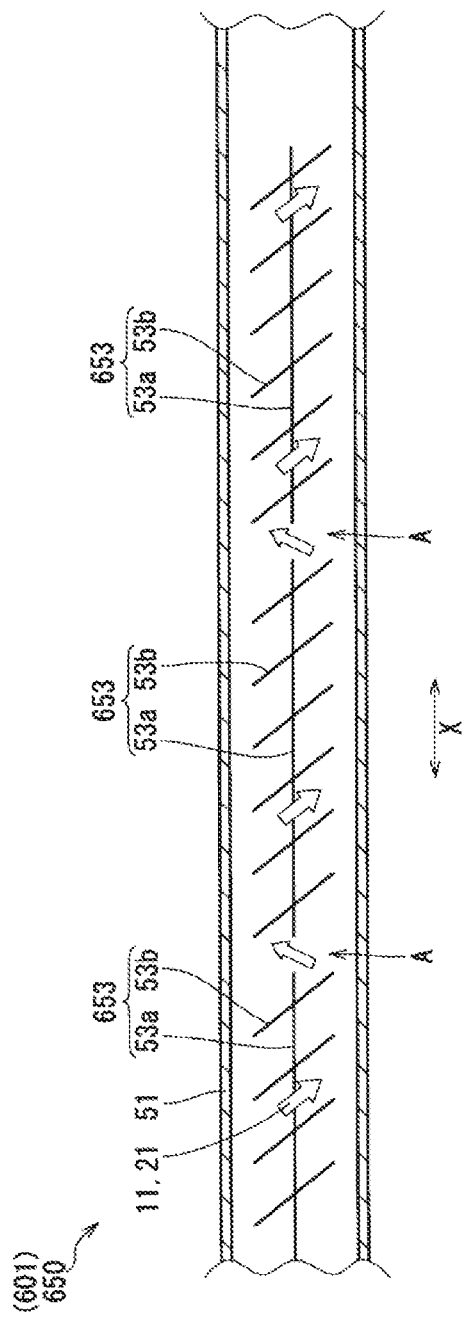
FIG. 13 is a sectional view, corresponding to FIG. 2, of a mixer of a mixing apparatus according to a sixth embodiment.

The mixing apparatus 601 shown in FIG. 13 provides the following advantages.

(Advantages of 14th Aspect of Invention)

[Configuration 14] The mixing blades 653 are arranged at intervals in the axial direction X of the chamber 51.

With the above [Configuration 14], a flow passage for the materials 21 can be made complex in the regions (gap regions A) formed between the mixing blades 653 in the axial direction X. As a result, the materials 21 can be mixed together more thoroughly.

Seventh Embodiment

Differences of a mixing apparatus 701 according to a seventh embodiment from the mixing device according to the first embodiment is described with reference to FIG. 14. The mixer 50 of the mixing apparatus 701 includes heaters 759.

The heaters 759 heat the inside of the chamber 51 (see FIG. 2; this also applies to the following). The heaters 759 heat the working fluid 11 and the materials 21 existing in the chamber 51. Although in the example shown in FIG. 14, the heaters 759 are disposed at three positions, the heater(s) 759 may be disposed at one position, two positions, or four or more positions.

The heaters 759 are used for maintaining a state (e.g., supercritical state or the like) of the working fluid 11. As a control for maintaining a state of the working fluid 11, a temperature control is easier than a pressure control. More specifically, the difference between a pressure of the working fluid 11 being in a supercritical state or the like and atmospheric pressure is large (the former is about 74 times or more as high as the latter in the case of carbon dioxide, for example). Thus, it is more difficult to fine-adjust the pressure of the working fluid 11 than its temperature. Furthermore, energy consumed by a pressure control may be larger (a motive power loss may be larger) than that consumed by a temperature control. In view of the above, in this embodiment, a control is performed using the heaters 759 so that a state (e.g., supercritical state or the like) of the working fluid 11 is maintained. As a modification, the pressure of the working fluid 11 may be controlled to maintain a state of the working fluid 11.

The heaters 759 are used to control the progress of a chemical reaction of the materials 21 in the mixer 50 (in the chamber 51). Incidentally, the heaters 759 may be used for only one of the controls for maintaining a state of the working fluid 11 and the control of the progress of a chemical reaction of the materials 21.

Figure 14:
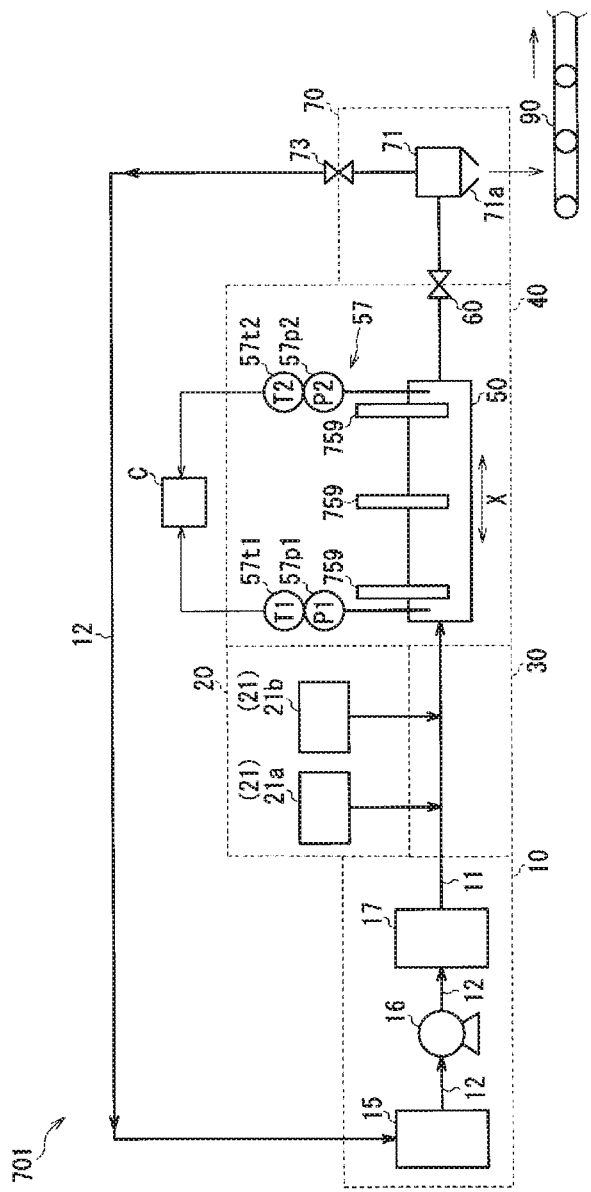
FIG. 14 is a block diagram, corresponding to FIG. 1, of a mixing apparatus according to a seventh embodiment.

The mixing apparatus 701 shown in FIG. 14 provides the following advantages.

(Advantages of 15th Aspect of Invention)

[Configuration 15] The mixer 50 includes the heaters 759 for heating the inside of the chamber 51.

The temperature in the mixer 50 (in the chamber 51) can be controlled by the heaters 759 of the above [Configuration 15].

The above [Configuration 15] nay provide the following advantages. A state (e.g., supercritical state or the like) of the working fluid 11 can be maintained by controlling the temperature in the mixer 50. Furthermore, the progress of a reaction of the materials 21 can be controlled by controlling the temperature in the mixer 50. Where materials 21 are mixed together by a rotary blade that rotates with respect to a chamber, it is not necessary to provide heaters because usually the materials can be heated by heat generated by friction between the rotary blade and the materials.

Eighth Embodiment

Differences of a mixing apparatus 801 according to an eighth embodiment from the mixing device according to the first embodiment is described with reference to FIGS. 15 and 16. The mixer 50 of the mixing apparatus 801 is provided with a cooler 859. The cooler 859 cools the working fluid 11 and the materials 21 in the chamber 51. The cooler 859 is disposed downstream of heaters 759.

Where the mixer 50 includes the cooler 859 and the heaters 759, the temperature in the mixer 50 can be controlled more finely than in the case where the mixer 50 includes only the heaters 759. For example, where the mixer 50 includes only the heaters 759, it is conceivable to, for example, control the temperature in the mixer 50 by on/off-switching the heaters 759 (on/off control). The temperature in the mixer 50 can be controlled more finely by cooling the inside of the mixer 50 with the cooler 859 in addition to on/off-controlling the heaters 759. As a result, energy that is necessary for the temperature control in the mixer 50 can be suppressed.

Furthermore, the pressure of the working fluid 11 can be lowered smoothly by cooling the inside of the mixer 50 with the cooler 859. More specifically, the pressure of the working fluid 11 can be controlled by the pressure adjustment valve 73. However, there may occur a case that the pressure of the working fluid 11 cannot be controlled finely only by the pressure adjustment valve 73. In view of this, in addition to controlling (lowering) the pressure of the working fluid 11 by the pressure adjustment valve 73, the pressure of the working fluid 11 is controlled (lowered) by the cooler 859. This makes it possible to change the state of the working fluid 11 smoothly from a supercritical state or a subcritical state to a high-pressure gas, then to a middle-pressure gas, and finally to a low-pressure gas.

The cooler 859 is used for controlling the progress of a chemical reaction of the materials 21. More specifically, for example, a following control can be performed using the cooler 859. FIG. 16 shows a relationship between the distance in the axial direction X from the entrance of the chamber 51 (horizontal axis) and the temperature T in the chamber 51 (vertical axis). In the following, individual elements of the mixing apparatus 801 is described with reference to FIG. 15. The working fluid 11 and the materials 21 flow from the entrance of the chamber 51 to its downstream side and are heated by the heaters 759. As a result, the temperature T in the mixer 50 is increased to a temperature Tb (desired temperature) that is necessary for a chemical reaction of the materials 21. After the chemical reaction of the materials 21 has proceeded properly (after the reaction has completed), the temperature in the mixer 50 is lowered by the cooler 859. At this time, for example, the temperature T in the mixer 50 is lowered to a temperature (normal mixing temperature Tn) of a case that none of the heaters 759 and the cooler 859 are provided. Degradation of the materials 21 can be suppressed by the above controls.

As a modification, the cooler 859 may be provided in a case that no heaters 759 are provided.

Figure 15:
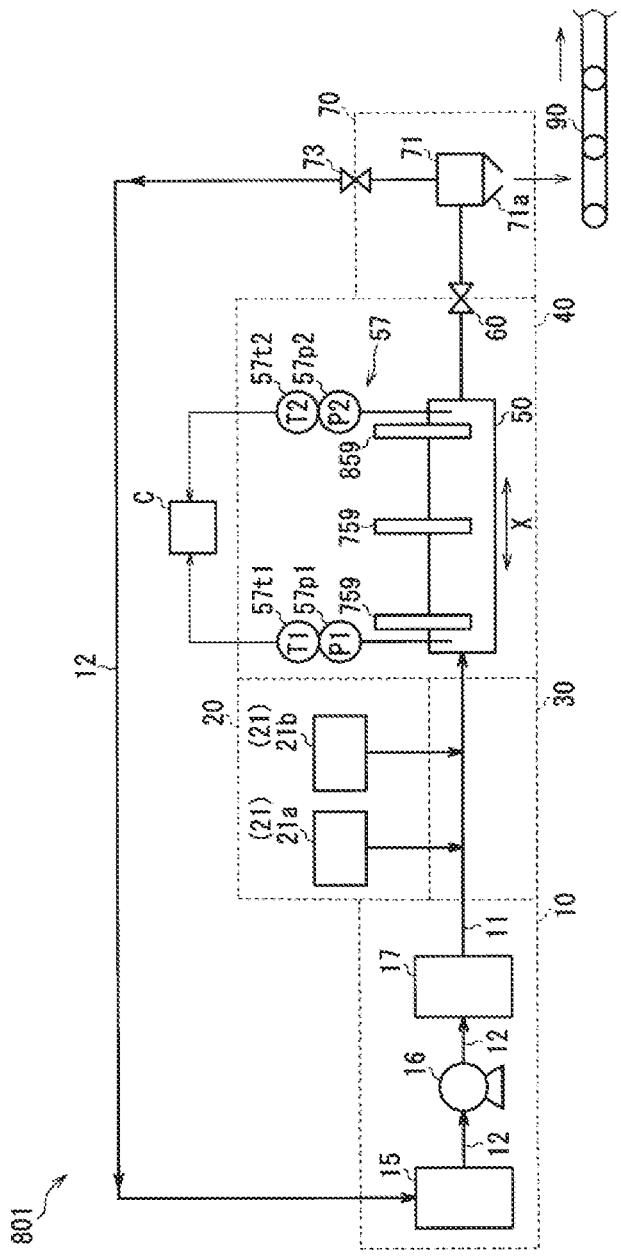
FIG. 15 is a block diagram, corresponding to FIG. 1, of a mixing apparatus according to an eighth embodiment.
Figure 16:
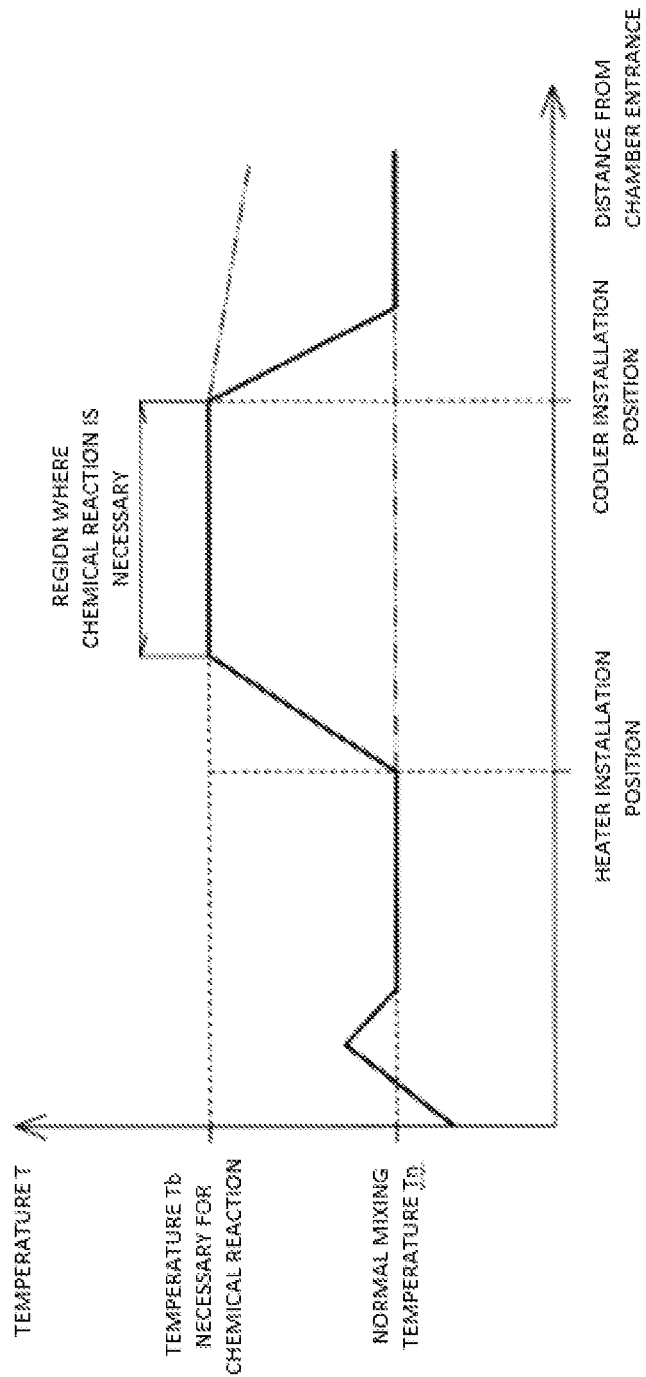
FIG. 16 is a graph showing temperatures T in a chamber shown in FIG. 15.

The mixing apparatus 801 shown in FIG. 15 provides the following advantages.

(Advantages of 16th Aspect of Invention)

[Configuration 16] The mixer 50 includes the cooler 859 for cooling the inside of the chamber 51.

The temperature in the chamber 51 can be controlled by the cooler 859 of the above [Configuration 16].

The above [Configuration 16] may provide the following advantages. The progress of a reaction of the materials 21 can be controlled while the working fluid 11 is kept in a supercritical state or the like by controlling the temperature in the mixer 50. Furthermore, the pressure of the working fluid 11 can be lowered smoothly. Thus, the state of the working fluid 11 (fluid 12) can be changed smoothly from a supercritical state or a subcritical state to a gas. This makes it possible to suppress bubble formation due to quick pressure reduction and hence to suppress noise generated by bubble formation. Furthermore, energy loss due to generation of noise can be suppressed.

Ninth Embodiment

Differences of a mixing apparatus 901 according to a ninth embodiment from the mixing device according to the first embodiment is described with reference to FIG. 17. The separation unit 70 of the mixing apparatus 901 includes an auxiliary mixer 980.

The auxiliary mixer 980 (auxiliary mixing apparatus, auxiliary kneading apparatus) is an apparatus for exerting force to the materials 21. More specifically, the separator 71 can separate the working fluid 11 (fluid 12) from the materials 21 by lowering the pressure of the working fluid 11 and the materials 21 to (approximately) atmospheric pressure, for example. However, only with the devolatilization using the separator 71, there may occur a case that a fluid 12 remains in, for example, gaps in the materials 21. In view of this, the auxiliary mixer 980 exerts force on the materials 21. This force is a force that is produced by a pressure that is at least higher than atmospheric pressure. In this manner, the auxiliary mixer 980 closes gaps in the materials 21 and thereby separate a fluid 12 from the materials 21. The auxiliary mixer 980 exerts a shearing force on the materials 21. In this case, the auxiliary mixer 980 can adjust the molecular weights of the materials 21 and hence makes it possible to, for example, manage the quality of rubber. The auxiliary mixer 980 is disposed downstream of the mixer 50 and the separator 71. The auxiliary mixer 980 exerts force on the materials 21 using, for example, a rotary blade (i.e., a blade that rotates with respect to a chamber).

Figure 17:
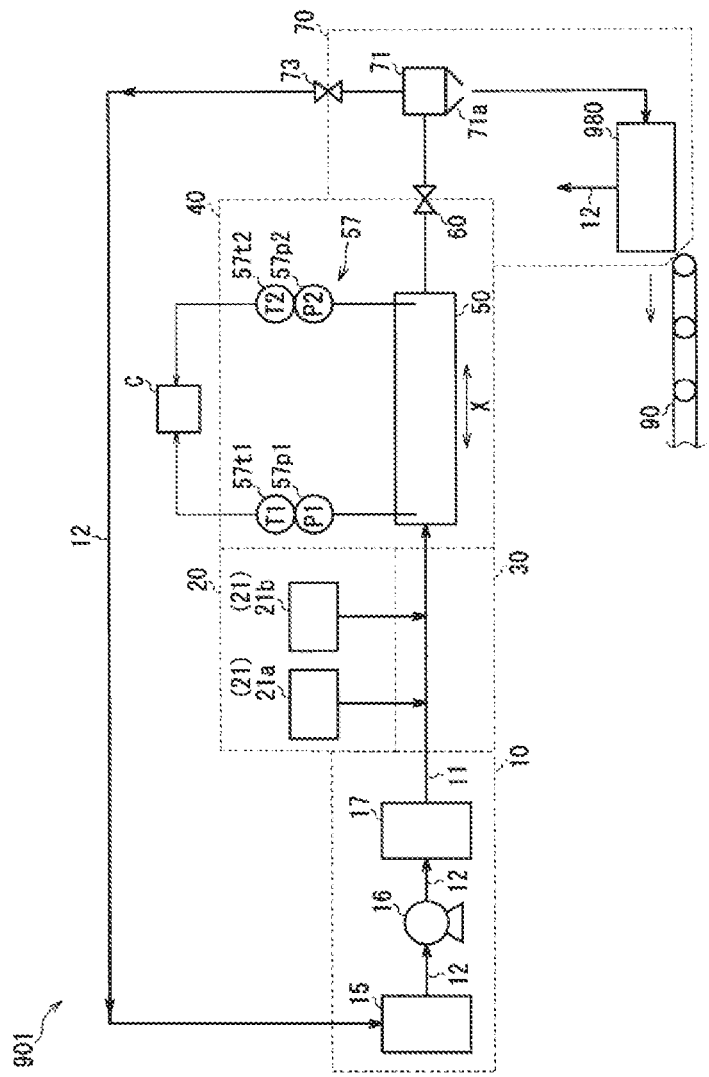
FIG. 17 is a block diagram, corresponding to FIG. 1, of a mixing apparatus according to a ninth embodiment.

The mixing apparatus 901 shown in FIG. 17 provides the following advantages.

(Advantages of 17th Aspect of Invention)

[Configuration 17] The mixing apparatus 901 includes the auxiliary mixer 980. The auxiliary mixer 980 is disposed downstream of the mixer 50 and exerts a pressure that is higher than atmospheric pressure on the materials 21.

The above [Configuration 17] makes it possible to separate the working fluid 11 (fluid 12) from the materials 21 reliably. As a result, for example, the quality of the materials 21 can be made higher.

(Modifications)

The above-described embodiments may be modified in various manners. For example, constituent elements of different embodiments may be combined together. For example, the positions and shapes of individual constituent elements may be changed. For example, the number of constituent elements may be changed and part of the constituent elements may be omitted.

For example, the mixer 250 shown in FIG. 7 that is inclined with respect to the horizontal direction may be applied to the second and fourth to ninth embodiments. For example, the sensors 57 shown in FIG. 1 may be omitted. For example, the center axis of the mixing blade 53 shown in FIG. 12 etc. may be curved (e.g., shaped like a spiral). Where the center axis of the mixing blade 53 is curved, the cross section center line 551a of the chamber 51 may either be curved or be straight.

The present application is based on Japanese Patent Application No. 2017-214760 filed on Nov. 7, 2017, the disclosure of which is incorporated herein by reference.

DESCRIPTION OF SYMBOLS 1, 201, 301, 401, 501, 601, 701 801, 901: Mixing apparatus
11: Working fluid
16: Pump
21: Materials
50, 250, 350, 450, 550, 650: Mixer
51: 451, 551: Chamber
53, 553, 653: Mixing blade(s)
57$p1$: Mixer entrance pressure gauge
57$p2$: Mixer exit pressure gauge
57$p3$: Mid-mixer pressure gauge
57$t1$: Mixer entrance thermometer
57$t2$: Mixer exit thermometer
57$t3$: Mid-mixer thermometer
60: Degree-of-opening adjustment valve
71: Separator
71a: Opening portion
73: Pressure adjustment valve
b 355: Mixing acceleration member
551a: Cross section center line
759: Heater
859: Cooler
980: Auxiliary mixer
X: Axial direction

The invention claimed is:

1. A mixing apparatus comprising a mixer configured to mix a material including a rubber or a resin in the presence of a working fluid that is in a supercritical state or a subcritical state,
wherein the mixer comprises:
a chamber that forms a flow passage for the working fluid and the material;
a mixing blade disposed in the chamber and fixed to the chamber,
a mixer entrance pressure gauge configured to detect a pressure within an entrance-side portion of the mixer;
a mixer exit pressure gauge configured to detect a pressure within an exit-side portion of the mixer;
a mixer entrance thermometer configured to detect a temperature within an entrance-side portion of the mixer; and
a mixer exit thermometer configured to detect a temperature within an exit-side portion of the mixer, and
wherein the mixer is inclined with respect to a horizontal direction so that the material goes down from an upstream side to a downstream side of the mixer.

2. The mixing apparatus according to claim 1, comprising a separator provided downstream of the mixer and configured to separate the working fluid from the material.

3. The mixing apparatus according to claim 2, comprising a pressure adjustment valve configured to adjust a degree of opening of a flow passage through which the working fluid separated from the material is to pass.

4. The mixing apparatus according to claim 2,
wherein the separator comprises an opening portion configured to intermittently eject the material from which the working fluid has been separated.

5. The mixing apparatus according to claim 3,
wherein the separator comprises an opening portion configured to intermittently eject the material from which the working fluid has been separated.

6. The mixing apparatus according to claim 1, comprising a degree-of-opening adjustment valve configured to adjust a degree of opening of a flow passage through which the working fluid and the material ejected from the mixer are to pass.

7. The mixing apparatus according to claim 1, further comprising a controller configured to control a differential pressure between the pressure detected by the mixer entrance pressure gauge and the pressure detected by the mixer exit pressure gauge so that the differential pressure falls within a prescribed range.

8. The mixing apparatus according to claim 1, wherein the mixer comprises:

a mid-mixer pressure gauge configured to detect a pressure at a portion located downstream of the mixer entrance pressure gauge and upstream of the mixer exit pressure gauge; and a mid-mixer thermometer configured to detect a temperature at a portion located downstream of the mixer entrance thermometer and upstream of the mixer exit thermometer.

9. The mixing apparatus according to claim 1, wherein the mixer comprises a mixing acceleration member, and wherein the mixing acceleration member is fixed to the chamber, blocks a part of the flow passage in the chamber, and is provided separately from the mixing blade.

10. The mixing apparatus according to claim 1, wherein a sectional area of the chamber as viewed from an axial direction varies depending on a position in the axial direction.

11. The mixing apparatus according to claim 1, wherein a line obtained by connecting centers of cross sections, as viewed from an axial direction of the chamber, of the chamber is shaped like a curved line or a polygonal line.

12. The mixing apparatus according to claim 1, wherein the mixing blades are arranged at intervals in an axial direction of the chamber.

13. The mixing apparatus according to claim 1, wherein the mixer comprises a heater configured to heat inside the chamber.

14. The mixing apparatus according to claim 1, wherein the mixer comprises a cooler configured to cool inside the chamber.

15. The mixing apparatus according to claim 1, comprising an auxiliary mixer disposed downstream of the mixer and configured to exert a pressure that is higher than atmospheric pressure on the material.

16. The mixing apparatus according to claim 1, comprising a pump configured to send out the working fluid to the mixer, wherein a rotation speed of the pump is inverter-controlled.

* * * * *